United States Patent
Tippmann

(10) Patent No.: US 7,237,600 B2
(45) Date of Patent: Jul. 3, 2007

(54) SUPPORT SURFACE FOR HEATING OR COOLING FOOD ARTICLES AND METHOD OF MAKING THE SAME

(76) Inventor: Edward Joseph Tippmann, 4538 Doenges Dr., Fort Wayne, IN (US) 46815

( * ) Notice: Subject to any disclaimer, the term of this patent is extended or adjusted under 35 U.S.C. 154(b) by 33 days.

(21) Appl. No.: 11/043,765

(22) Filed: Jan. 26, 2005

(65) Prior Publication Data

US 2006/0162908 A1    Jul. 27, 2006

(51) Int. Cl.
*F28F 13/06*    (2006.01)
(52) U.S. Cl. ..................... 165/119; 165/146
(58) Field of Classification Search ............... 165/101, 165/119, 171, 172, 173, 175, 177, 146
See application file for complete search history.

(56) References Cited

U.S. PATENT DOCUMENTS

| | | | | |
|---|---|---|---|---|
| 1,242,473 A | * | 10/1917 | Prentice | ................ 165/174 |
| 2,135,235 A | * | 11/1938 | Hurford et al. | ............. 165/135 |
| 2,499,608 A | * | 3/1950 | Rink | ........................... 165/142 |
| 2,709,128 A | * | 5/1955 | Krause | ...................... 165/180 |
| 2,797,554 A | * | 7/1957 | Donovan | .................... 165/174 |
| 3,648,754 A | * | 3/1972 | Sephton | ..................... 165/174 |
| 4,300,481 A | * | 11/1981 | Fisk | ............................ 165/174 |
| 4,593,754 A | * | 6/1986 | Holl | ............................ 165/174 |
| 5,632,329 A | * | 5/1997 | Fay | ............................. 165/146 |
| 6,263,963 B1 | * | 7/2001 | Tippmann et al. | .......... 165/171 |
| 6,626,235 B1 | * | 9/2003 | Christie | ..................... 165/158 |
| 2001/0003309 A1 | * | 6/2001 | Aoyagi et al. | ............. 165/146 |

* cited by examiner

*Primary Examiner*—Teresa J. Walberg
(74) *Attorney, Agent, or Firm*—Wilson Daniel Swayze, Jr.

(57) ABSTRACT

A heat transfer support surface for heating or cooling food articles placed adjacent the support surface by circulating a heat transfer fluid in the internal passages of the support surface is disclosed. Circulated fluid is heated or cooled by a source. Support surface contains multiple heat transfer elements arranged substantially in parallel and interconnected on both ends. Flow control tubes control the fluid flow and reduce the amount of fluid required. The method of making the support surface is also disclosed.

21 Claims, 5 Drawing Sheets

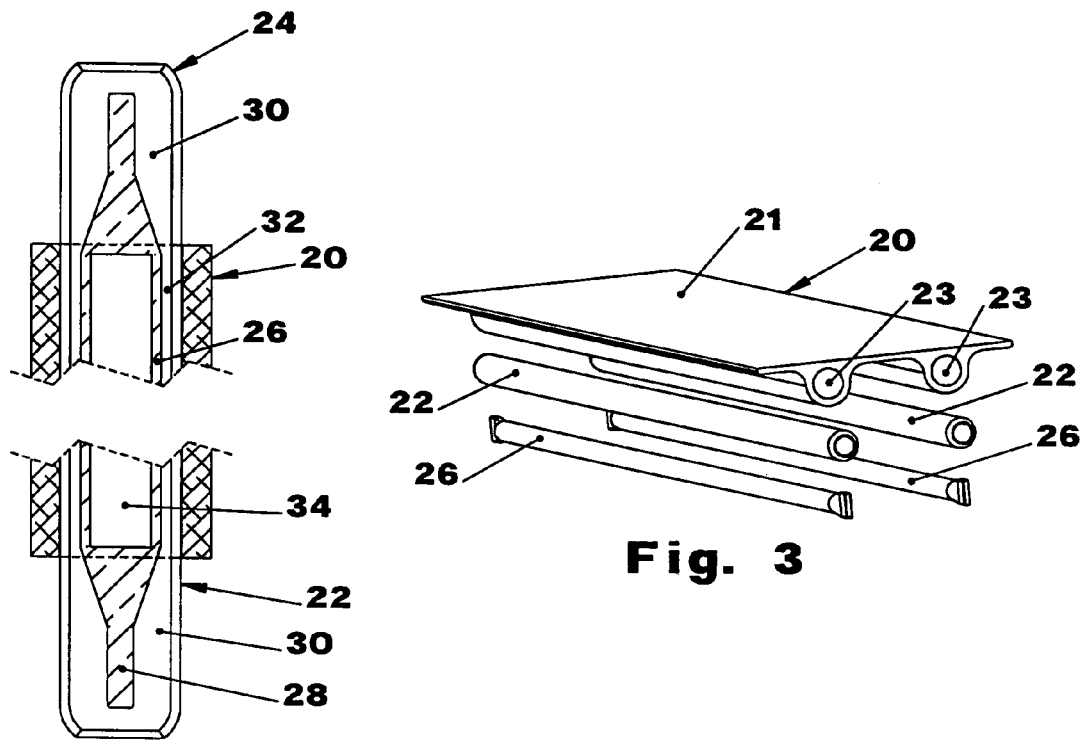
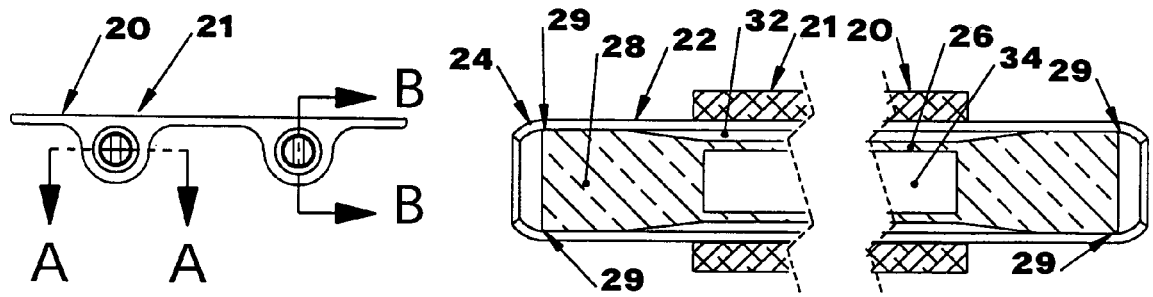

DETAIL B

DETAIL B

SECTION E-E

DETAIL B

DETAIL F

DETAIL D

SUPPORT SURFACE FOR HEATING OR COOLING FOOD ARTICLES AND METHOD OF MAKING THE SAME

FIELD OF THE INVENTION

The present invention relates to a heat transfer support surface that uses a circulated heat transfer fluid for heating or cooling food articles placed adjacent the surface. The support surface would be applicable to food cooking or holding cabinets such as in U.S. Pat. No. 4,210,675 to Lieberman et al. incorporated by reference as well as other types of fixtures for heating or cooling food, adapted for use with the present invention.

BACKGROUND OF THE INVENTION

Heat transfer support surfaces with multiple heat transfer elements in parallel that use orifices to control the fluid flow are disclosed in U.S. Pat. No.'s 5,086,693, 5,960,869, and 6,263,963 to Tippmann et al, all incorporated by reference.

In general, the support surface includes multiple heat transfer elements positioned in parallel. Each heat transfer element contains at least one passageway for transferring heat to or from the fluid circulating therein. Headers are used to interconnect the fluid flow at both ends of the heat transfer elements.

In order for the support surface to transfer the amount of heat required, the fluid contact surface area of the internal passages needs to be of adequate size. Also, the internal passages should be round in shape to accept the tubular elements that interconnect the heat transfer elements to the headers at both ends. When the internal surface area of the round internal passages increases, the volume of fluid also increases and the velocity of the fluid flow decreases, this increases the laminar flow of the heat transfer fluid. The laminar flow reduces heat transfer and contributes to an uneven surface temperature. This uneven surface temperature is undesirable.

SUMARRY

The present invention utilizes a flow control tube inserted into the internal passages of the heat transfer elements, that reduces the volume of the internal area of said passages while maintaining the same internal fluid contact surface area. The fluid flow dynamics are altered by increasing the fluid velocity near the internal surfaces of said passages that improves heat transfer of the heat transfer elements and contributes to a more even surface temperature of the support surface. Another benefit of the reduced volume is that the amount of heat transfer fluid required is reduced and less heat up or cool down time is required for the support surface. Also, a smaller fluid expansion tank on the interconnected system would be required. Another benefit of the reduced area is that it creates a fluid flow restriction, which eliminates the need for an orifice to balance the fluid flow between the heat transfer elements. Such orifices plug up easily with solids and render the heating element inoperable, which can cause an unsafe condition for the food items being heated or cooled if undetected.

Another object of the present invention is to provide a filtering area at the inlet of each support element to reduce the chance of the heat transfer elements plugging with solids. A filtering area is placed near the fluid inlet end of the heat transfer elements. Solids could collect in this area without plugging the heat transfer elements. Additionally, a filtering device could be placed in the filtering area.

The direction of the majority of the heat transfer of the present invention is upwards to the food items placed adjacent the top surface. It is another object of the present invention to direct a larger amount of the fluid flow to the upper portions of the support surface.

Another object of the present invention is to provide a way of positioning the flow control tube inside the heat transfer elements by forming the ends of the flow control tubes.

It is therefore the object of the present invention to provide a support surface for transferring heat to or from food articles.

It is another object of the present invention to provide a method of making the subject support surface. This, as well as other objects and advantageous features of the present invention will be come apparent and be pointed out hereinafter.

BRIEF DESCRIPTION OF THE DRAWINGS

FIG. 3 illustrates an exploded perspective view of internal components of one of the heat transfer elements;

FIG. 4 illustrates an end view of one of the heat transfer elements;

FIG. 5 illustrates a cross-sectional view of the fluid control tubes;

FIG. 6 illustrates another cross-sectional view of the fluid control tubes;

DETAILED DESCRIPTION

Figure 1:
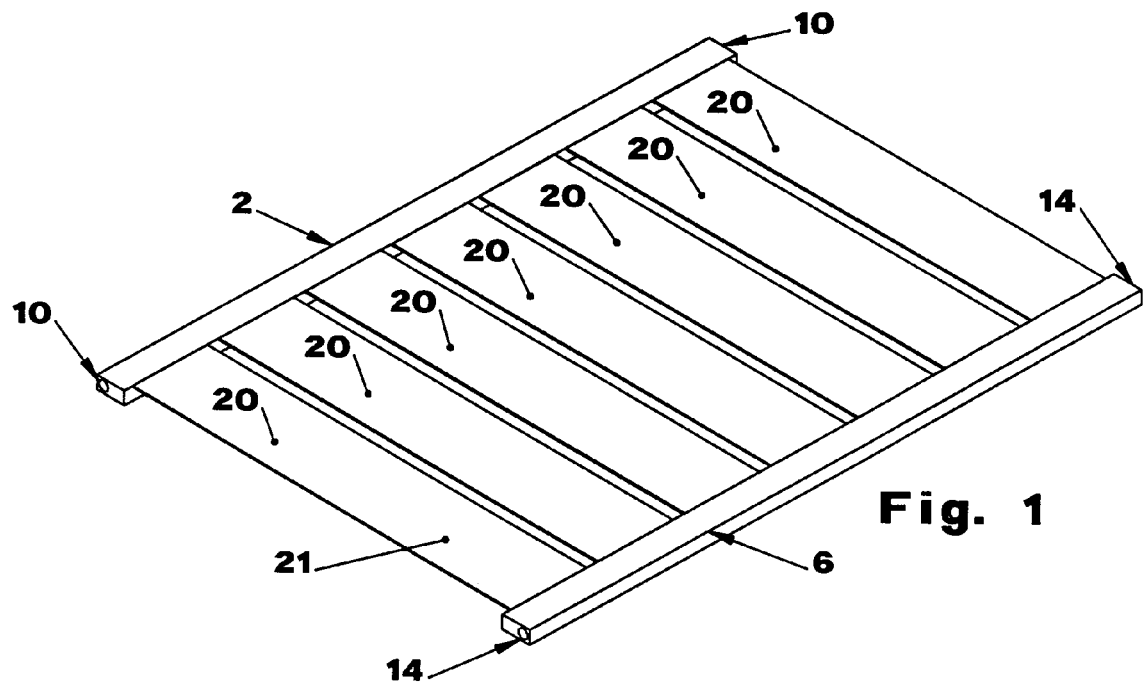
FIG. 1 illustrates a perspective view of a heat transfer support surface assembly.

Referring now to FIG. 1, a perspective view of a heat transfer support surface assembly is shown in which several heat transfer elements 20 are arranged substantially in parallel. Heat transfer elements 20 could typically be made from an aluminum extrusion. Heat transfer elements 20 are interconnected on one end by a fluid supply header 2 and on the other end by a fluid return header 6. In the preferred embodiments, headers 2 and 6 could be typically be made from an aluminum extrusion also. A heated or cooled fluid enters at either opening 10 on supply header 2 and exits at either opening 14 on return header 6. The support surface top, which is shown as substantially flat but other shapes could be employed, is indicated by numeral 21 throughout several views. The support surface top 21 is where food articles would typically be placed, usually in pans.

Figure 2:
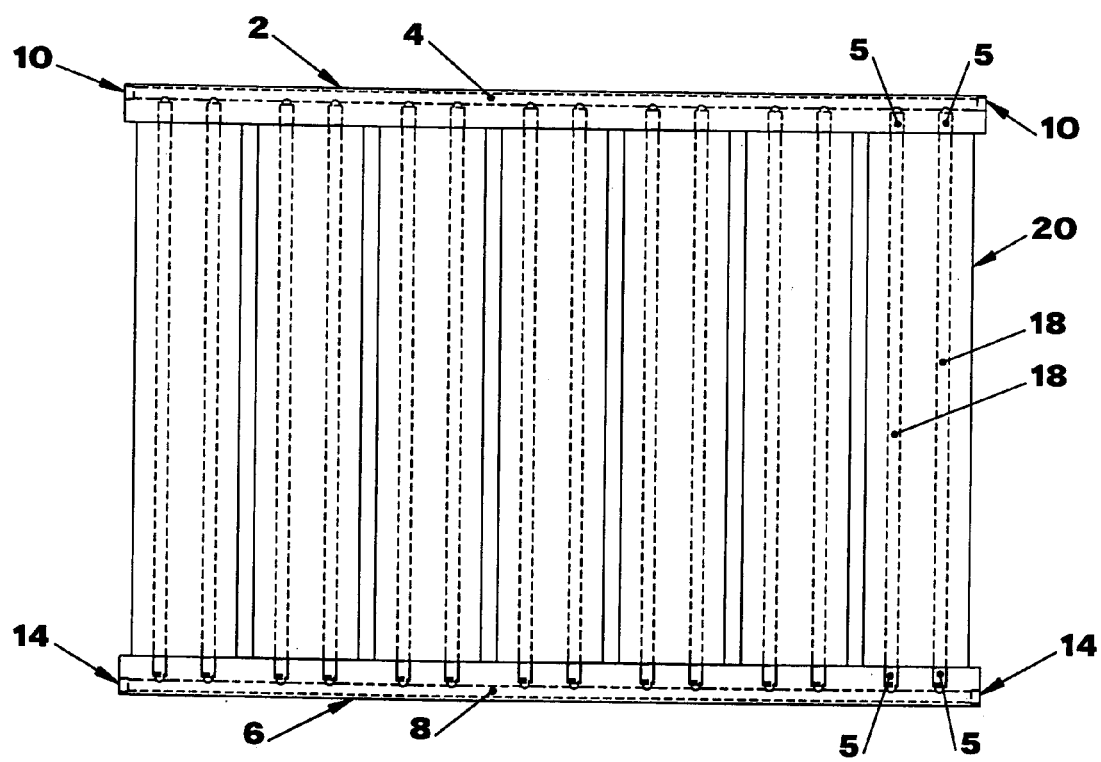
FIG. 2 illustrates a top plan view showing the internal passages.

Moving now to FIG. 2, a top plan view of the fluid flow of the present invention is shown wherein the internal passages are shown in dashed lines. For simplicity, numeral 5 and 18 identify passages in only one heat transfer element 20 connection, but exist in all. Fluid enters header 2 at either port 10 and travels through passage 4 and entering passages 18 of heat transfer elements 20 via apertures 5 of header 2. Fluid exits heat transfer elements 20 and enters passage 8 via apertures 5 of return header 6. Finally, the fluid exits at either port 14 of return header 6. The flow pattern between the heat transfer elements would be parallel and in the same direction. Alternatively, by placing strategically located stops (not shown) in passages 4 and or 8, the fluid flow can be converted to a serpentine flow pattern between the heat transfer elements.

Figure 7:
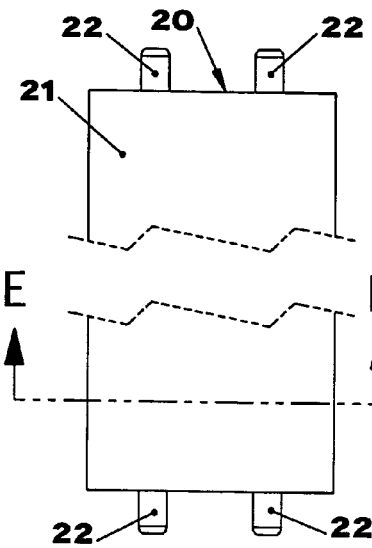
FIG. 7 illustrates a top view of the heat transfer elements and support surface.
Figure 9:
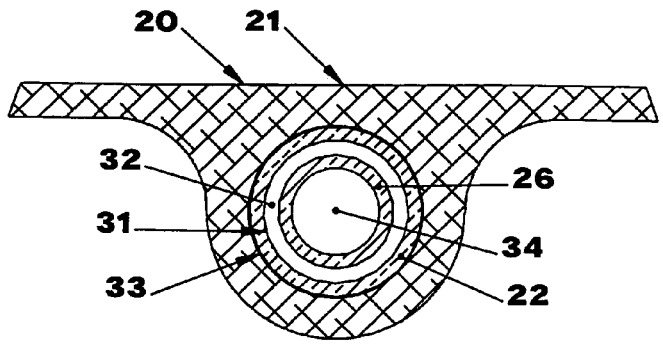
FIG. 9 illustrates a cross sectional detail of the heat transfer elements and support surface.

In one embodiment of the present invention, FIG. 3 shows an exploded perspective view of internal components of one of the heat transfer elements 20. Outer tubular elements 22 are placed in the openings 23 of the heat transfer element 20 in a good heat transfer relationship therewith by any known means such as mechanically expanding the tube, temperature difference, or merely a tight fit. In order to facilitate connecting to headers 2 and 6, a small portion of tubes 22 extends beyond ends of heat transfer elements 20 as can be seen in FIG. 7. Alternatively, the extending portion of tube elements 22 can be interconnected by means other than the described headers 2 and 6, such as by using tube fittings or rubber hoses with clamps. Flow control tubes or rods 26, which will be explained in detail, are placed inside tubular elements 22.

Controlling the fluid flow in one embodiment of the present invention can be explained from FIGS. 5 and 6, while the basic principle of controlling the flow exists in all the embodiments. Looking at FIG. 5, after the fluid enters tube 22 at area 30, it is constricted down to area 32. This forces all the fluid into high velocity contact with the internal surfaces of tube 22, thereby enhancing the heat transfer and evenness of surface 21 temperatures. Furthermore, the restriction created by flow control tubes 26 has an effect of balancing the flow between passages 18 of FIG. 2. The lower velocity area 30 can also be used as a filtering area, where solid particles can settle before they plug the constricted area 32. Shortening tube 26 can enlarge the filtering area 30 if more filtering area is desired. A filtering device, preferably a wire mesh strainer (not shown), could also be inserted in the fluid inlet filtering area 30.

A way of positioning the flow control tubes 26 inside tubes 22 can be seen in FIGS. 5 and 6. Compressing the ends of flow control tubes 26 in a die can form the ends into a desired shape. The formed ends 28 of flow control tubes 26 are shown in a top and side view in FIGS. 5 and 6 respectively. Lateral movement of tube 26 is constrained by formed ends 24 of tube 22 meeting formed ends 28 of tube 26 at point 29 as shown in FIG. 6. In one embodiment of the present invention, as shown in FIG. 6, the flow control tube 26 is centered vertically inside tube 22 by formed end 28 contacting the inside surface of tube 22. The formed ends 28 of flow control tubes 26, also prevents fluid flow from entering the inside areas 34 of flow control tubes 26. Sealing the ends of tube 26, after being formed, can also prevent fluid from residing inside, thereby decreasing the amount of fluid required in the system.

Figure 10:
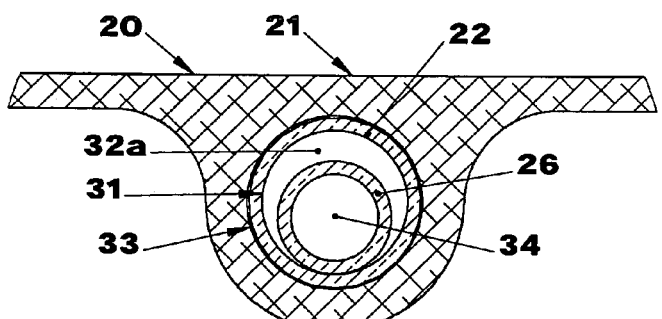
FIG. 10 illustrates an additional cross sectional detail of the heat transfer element and support surface.
Figure 8:
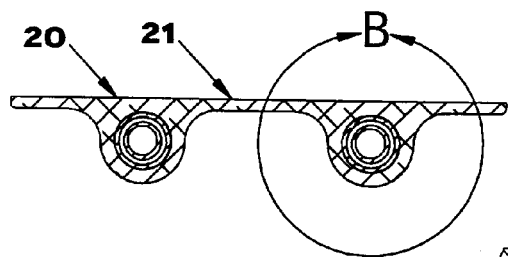
FIG. 8 illustrates a cross sectional view of the heat transfer elements and support surface.

Moving now to FIG. 10, which is a detail view B of FIG. 8, a way of positioning the flow control tube 26 off center can be seen. By forming flow control tube end 28 off center, the flow control tube 26 is positioned toward the bottom of the opening. When heat transfer fluid enters fluid area 32a, more fluid flow is forced towards the top of the opening. In the heat transfer support surface of the present invention it is desirable to have most of the heat transfer directed towards the top surface 21 where food articles are placed. The downward heat transfer to the lower area 35 is of less value. By positioning flow control tube 26 near the bottom, a greater amount of fluid is forced towards the upper portions of tube 22, thereby enhancing heat transfer and temperature evenness of the top surface 21.

Figures 12, 13:
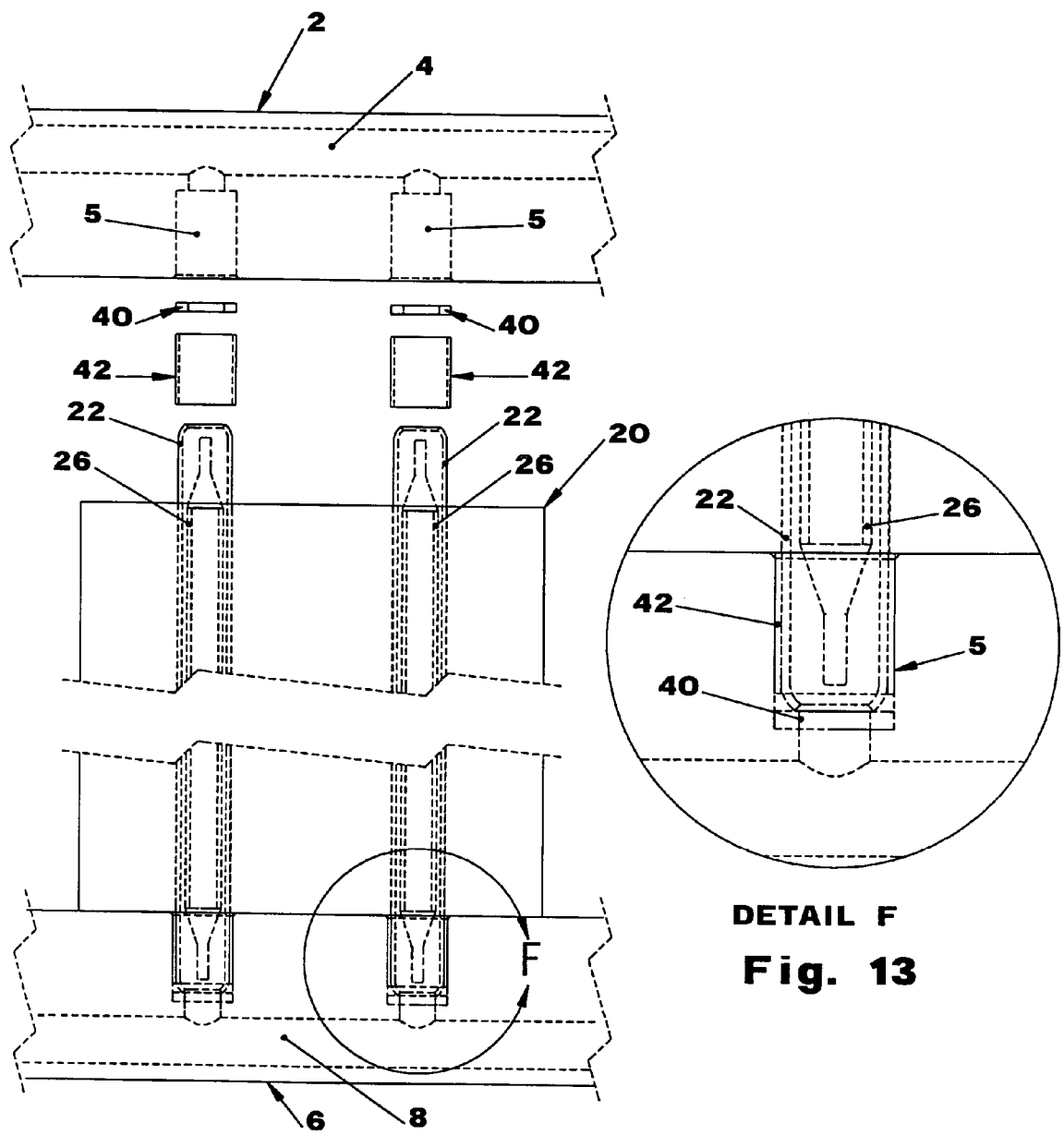
FIG. 12 illustrates an exploded view of the heat transfer elements with a header.
FIG. 13 illustrates a top view detail of the heat transfer elements with the header.

As can be best shown by FIGS. 7, 9, 12, and 13, a method and apparatus of shelf assembly is illustrated. Inner tubular elements 22 extend continuously through heat transfer element 20, with a small portion extending beyond as shown in FIG. 7 and 12. The sealed connection to headers 2 and 6 is made by first inserting for example Teflon washers 40 in apertures 5 of headers 2 and 6, to prevent possible galvanic corrosion between the ends of tube 22 and the header material. Next, Teflon sleeve type seals 42 are used to make the seal between the ends of tubes 22 and apertures 5 as shown in FIG. 13. The Teflon sleeve 42 could also be replaced with an O-ring type seal in a known manner. As can be best shown in FIG. 9, the heat transfer fluid in area 32 must first transfer heat to fluid contact surface 31 of tube 22, before it can be transferred to surface 33 of heat transfer element 20.

Figure 11:
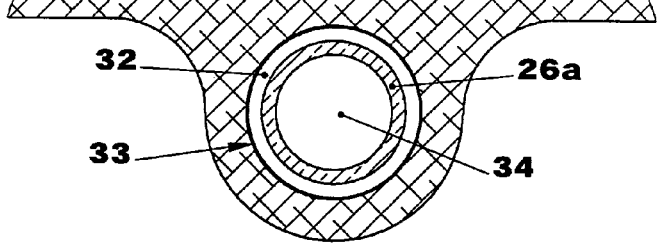
FIG. 11 illustrates a further cross sectional detail of the heat transfer element.
Figures 14, 15:
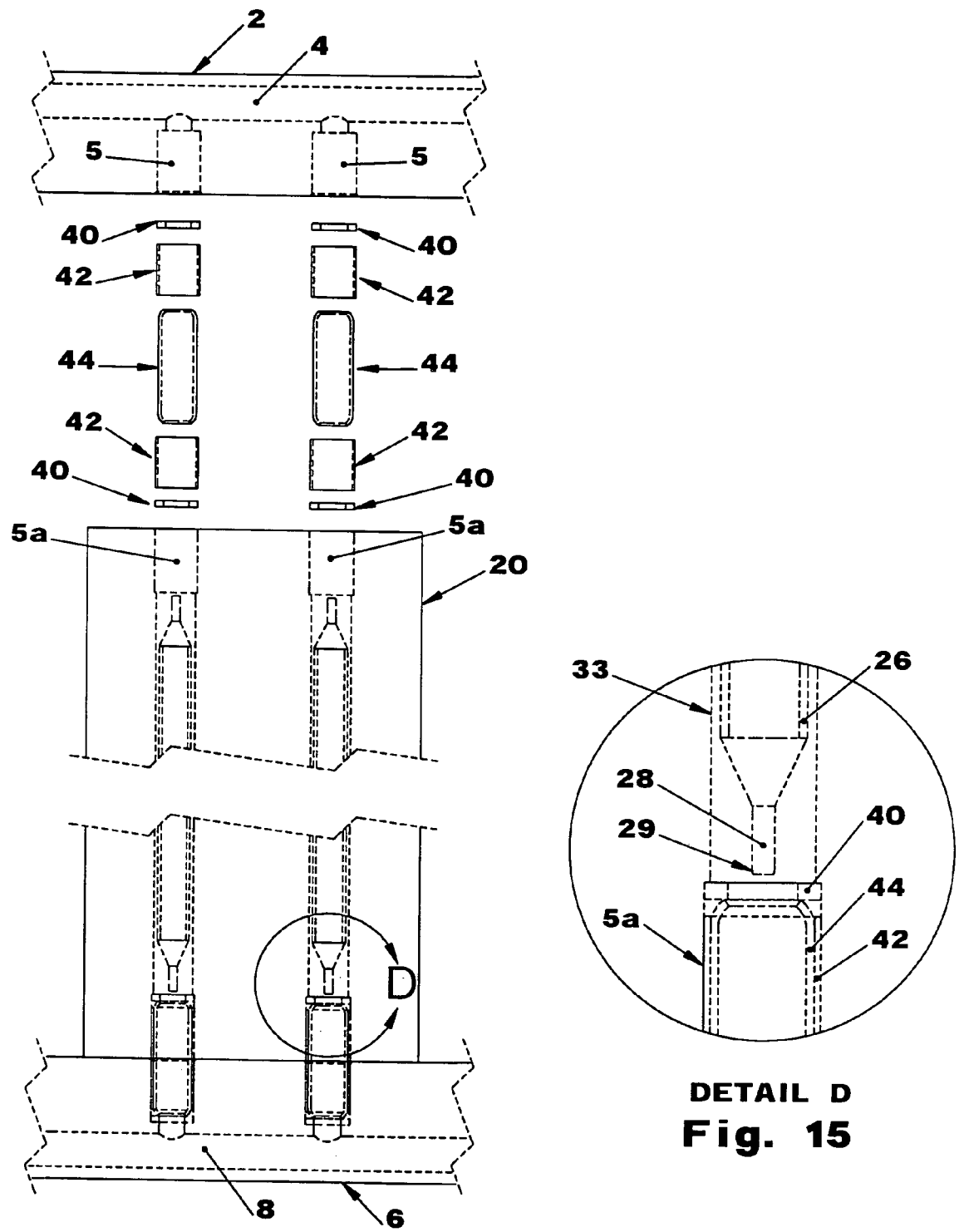
FIG. 14 illustrates an exploded view of the heat transfer elements with a header.
FIG. 15 illustrates a top view detail of the heat transfer elements with the header.

In another embodiment of the present invention, as can be best shown by FIGS. 11, 14, and 15, the inner tubular elements 22 are replaced by short tubular nipples 44, inserted into apertures 5 and 5a of headers 2 and 6 and heat transfer elements 20 respectively. Teflon washers 40 and sleeve inserts 42 perform the same function as described previously. As can be best shown by FIG. 11, the heat transfer fluid in area 32 can now transfer heat directly to heat transfer element 20 by direct contact with inner surface 33 of heat transfer element 20, which can increase the heat transfer rate. Alternatively, the short tubular nipples 44 can be connected to either apertures 5 or 5a by other ways than described, such as by threading or gluing together to eliminate some of the seals 42 on each end of heat transfer element 20. Furthermore, the fluid contact surface area 33 becomes greater when continuous tubular element 22 is not used if the size of opening 23 in heat transfer element 20 (FIG. 3) stays the same. This can also increase the heat transfer rate. Flow control tube 26a would need to be enlarged to compensate for the larger area of the passageway when tubular element 22 is eliminated.

From the foregoing, it is now apparent that a heat transfer support surface has been disclosed, obtaining the objects and advantageous features set out hereinbefore as well as others, and that numerous modifications as the precise shapes, configurations, and details made by those having ordinary skill in the art without departing from the spirit of the invention or the scope thereof as set out by the claims that follow.

What is claimed is:

1. A support surface for transferring heat between a source and food articles placed adjacent to said support surface, said support comprising:
   a) a plurality of longitudinally extending heat transfer support elements arranged substantially in parallel to form a substantially flat surface, each of said support elements having at least one longitudinal passageway therethrough extending from a first end to a second end thereof for transporting a heat transfer fluid, b) a first and second header for interconnecting the first end and second ends respectively, of said support elements in a fluid relationship, c) first and second end tube nipples for interconnecting said first and second header and said first and second ends of said support elements respectively in a fluid relationship, and d) a plurality of longitudinally extending flow control tubes of reduced diameter, operatively positioned by positioning means, in selective passageways of said support elements forming a reduced fluid passageway between said flow control tubes and said support elements that balances the fluid flow between said support elements and reduces the amount of heat transfer fluid therein.

2. A support surface as set forth in claim 1, wherein a flow control tube is inside each passageway of said support elements.

3. A support surface as set forth in claim 1, wherein selective said flow control tubes vary in length.

4. A support surface as set forth in claim 1, wherein selective said flow control tubes vary in diameter.

5. A support surface as set forth in claim 1, wherein selective said flow control tubes vary in diameter and length.

6. A support surface as set forth in claim 1, wherein said support surface further comprises a reduced fluid velocity filtering area being positioned near the inlet of the heat transfer support elements for filtering out solids.

7. A support surface as set forth in claim 1, wherein said support surface further comprises a filtering device being positioned near the inlet of the heat transfer support elements for filtering out solids.

8. A support surface as set forth in claim 1, wherein said flow control tubes are positioned by forming their ends.

9. A support surface as set forth in claim 1, wherein said flow control tubes are sealed on the ends to keep fluid out of the inside of the flow control tubes.

10. A support surface for transferring heat between a source and food articles placed adjacent to said support surface, said support comprising:

a) a plurality of longitudinally extending heat transfer support elements arranged substantially in parallel to form a substantially flat surface, each of said support elements having at least one longitudinal passageway there through extending from a first end to a second end thereof for transporting a heat transfer fluid, b) a first and second header for interconnecting the first end and second ends respectively, of said support elements in a fluid relationship, c) first and second end tube nipples for interconnecting said first and second header and said first and second ends of said support elements respectively in a fluid relationship, and d) a plurality of individual flow control tubes inserted in selective passageways of said support elements that controls the fluid flow and reduces the amount of heat transfer fluid therein, wherein said flow control tubes are positioned offset from the center of the internal passages in the heat transfer elements.

11. A support surface for transferring heat between a source and food articles placed adjacent to said support surface, said support comprising:

a) a plurality of longitudinally extending heat transfer support elements arranged substantially in parallel to form a substantially flat surface, each of said support elements having at least one longitudinal passageway there through extending from a first end to a second end thereof for transporting a heat transfer fluid, b) a continuous tubular element in each of said passageways of each of said support elements in heat transfer relationship therewith, said tubular elements having a portion thereof extending beyond said first end and second end of said passageways, c) a first and second header for interconnecting the first and second ends respectively, of extending portion of said tubular element in fluid relationship, and d) a plurality of longitudinally extending flow control tubes of reduced diameter, operatively positioned by positioning means, in selective passageways of said tubular elements forming a reduced fluid passageway between said flow control tubes and said tubular elements that balances the fluid flow between said support elements and reduces the amount of heat transfer fluid therein.

12. A support surface as set forth in claim 11, wherein said support surface further comprises a flow control tube being inside each said tubular element of said support elements.

13. A support surface as set forth in claim 11, wherein selective said flow control tubes vary in length.

14. A support surface as set forth in claim 11, wherein selective said flow control tubes vary in diameter.

15. A support surface as set forth in claim 11, wherein selective said flow control tubes vary in diameter and length.

16. A support surface as set forth in claim 11, wherein said support surface further comprises a reduced fluid velocity filtering area being positioned near the inlet of the heat transfer elements for filtering out solids.

17. A support surface as set forth in claim 11, wherein said support surface further comprises a filtering device being positioned near the inlet of the heat transfer support elements for filtering out solids.

18. A support surface as set forth in claim 11, wherein said flow control tubes are positioned by forming their ends.

19. A support surface as set forth in claim 11, wherein said flow control tubes are sealed on the ends to keep fluid out of the inside of the flow control tubes.

20. A support surface for transferring heat between a source and food articles placed adjacent to said support surface, said support comprising:

a) a plurality of longitudinally extending heat transfer support elements arranged substantially in parallel to form a substantially flat surface, each of said support elements having at least one longitudinal passageway there through extending from a first end to a second end thereof for transporting a heat transfer fluid, b) a continuous tubular element in each of said passageways of each of said support elements in heat transfer relationship therewith, said tubular elements having a portion thereof extending beyond said first end and second end of said passageways, c) first and second end tube nipples for interconnecting said first and second header and said first and second ends of said support elements respectively in a fluid relationship, and d) a plurality of individual flow control tubes inserted in selective passageways of said support elements that controls the fluid flow and reduces the amount of heat transfer fluid therein, wherein said flow control tubes are positioned offset from the center of the internal passages in the heat transfer elements.

21. The method of making a support surface for preparing food articles placed adjacent said surface comprising the steps of:

forming a plurality of longitudinally extending support elements, each having at least one longitudinal passageway extending there through from a first to a second end thereof;

positioning a tubular element in each said passageways in heat transfer relationship therewith, by expanding the support element or shrinking the tubular element;

positioning support elements in a side-by-side relationship to form a substantially flat surface;

attaching a header in fluid relationship to said tubular elements to transfer there between fluid from a source;

balancing the flow of said fluid from said header to said tubular elements by including flow control tubes of reduced diameter inside the tubular elements; providing a reduced fluid passageway between tubular elements and flow control tubes of reduced diameter;

increasing the fluid flow velocity in the tubular elements by including flow control tubes inside the tubular elements; altering the fluid flow toward the tubular elements fluid contact surfaces by including flow control tubes inside the tubular elements;

positioning of the flow control tubes inside the tubular elements by forming the ends of the flow control tubes; and sealing the ends of the flow control tubes to keep fluid out of the inside of the flow control tubes.

* * * * *